United States Patent
Mudulodu et al.

(10) Patent No.: US 7,813,437 B2
(45) Date of Patent: Oct. 12, 2010

(54) ESTIMATING FREQUENCY OFFSET AT A SUBSCRIBER STATION RECEIVER

(75) Inventors: Sriram Mudulodu, Santa Clara, CA (US); Louay Jalloul, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 670 days.

(21) Appl. No.: 11/900,799

(22) Filed: Sep. 13, 2007

(65) Prior Publication Data

US 2009/0074045 A1 Mar. 19, 2009

(51) Int. Cl.
*H04L 27/28* (2006.01)
(52) U.S. Cl. .................. 375/260; 375/229; 370/347
(58) Field of Classification Search .................. 375/260, 375/219, 220, 222; 370/319, 347; 455/70
See application file for complete search history.

(56) References Cited

U.S. PATENT DOCUMENTS

| | | | |
|---|---|---|---|
| 7,039,131 B2 | 5/2006 | Banerjea | |
| 7,218,691 B1 | 5/2007 | Narasimhan | |
| 7,224,666 B2 | 5/2007 | Gummadi et al. | |
| 2005/0169165 A1 | 8/2005 | Cimini et al. | |
| 2007/0142067 A1* | 6/2007 | Cheng et al. | 455/512 |
| 2007/0230388 A1* | 10/2007 | Li et al. | 370/313 |
| 2008/0205451 A1* | 8/2008 | Ramesh et al. | 370/491 |

* cited by examiner

*Primary Examiner*—Emmanuel Bayard
(74) *Attorney, Agent, or Firm*—Brian R. Short

(57) ABSTRACT

A method and system of estimating frequency offset at a subscriber station is disclosed. The method includes the subscriber station receiving a composite signal, in which the composite signal includes multi-carrier signals transmitted from a plurality of base stations. The subscriber station selects a subset of the plurality of base stations. The subscriber station selects at least one pair of multi-carrier symbols of the composite signal, wherein each of the at least one pair of multi-carrier symbols include a plurality of pilot sub-carriers. The subscriber station selects a subset of the plurality of pilot sub-carriers of the at least one pair of multi-carrier symbols based on transmit pilot symbols of the pilot sub-carriers of the multi-carrier signals transmitted by the subset of the plurality of base stations. The frequency offset is estimated based on a conjugate product between received symbols across at least one pair of multi-carrier symbols of each of the pilot sub-carriers of the selected subset of the plurality of pilot sub-carriers.

18 Claims, 3 Drawing Sheets

ESTIMATING FREQUENCY OFFSET AT A SUBSCRIBER STATION RECEIVER

FIELD OF EMBODIMENTS

The described embodiments relate generally to wireless communication networks and more specifically to methods of estimating frequency offset at a subscriber station receiver.

BACKGROUND

Wireless networks are gaining popularity because wireless infrastructures are typically easier and less expensive to deploy than wired networks. However, wireless networks can be susceptible to environmental conditions, interference and self-interference. A popular wireless network implementation uses base stations that communicate with wireless user devices that are located within cells formed by the base stations.

Carrier frequencies at the transmitter and the receiver are generally derived from different sources. For example, in 802.16e standard systems, the base stations (BS) derive their carrier frequency from a GPS (global positioning system) clock and the subscriber station (SS) typically derives its carrier frequency from a crystal oscillator. The carrier frequencies of the two devices can be as much as tens of KHz apart. The difference between the transmitter frequency and receiver frequency is referred to as the frequency offset.

A large frequency offset error degrades the performance of the receiver. The smaller the frequency offset, the better the performance of the receiver. Better performance translates to increased data rates, lower transmitter power, and therefore, increased battery life.

The performance of the frequency offset estimation and tracking must be adequate even in the presence of interference. Generally, there are two main additive impairments at the receiver in a wireless communication system. The impairments include both interference and noise. The interference can come from devices inside and outside of the system. The noise is typically includes Additive White Gaussian Noise (AWGN) or thermal noise. Most wireless systems are interference limited, meaning the effect of interference dominates that of additive noise at the receiver. Frequency offset estimation and tracking algorithms can be used to reduce the effects of interference and noise.

There is a need for method and system for estimating frequency offset between a wireless base station and a wireless terminal in the presence of interference.

SUMMARY

A first embodiment includes a method of estimating frequency offset at a subscriber station. The method includes the subscriber station receiving a composite signal, wherein the composite signal includes multi-carrier signals transmitted from a plurality of base stations. The subscriber station selects a subset of the plurality of base stations. The subscriber station selects at least one pair of multi-carrier symbols of the composite signal, wherein each of the at least one pair of multi-carrier symbols include a plurality of pilot sub-carriers. The subscriber station selects a subset of the plurality of pilot sub-carriers from the at least one pair of multi-carrier symbols based on transmit pilot symbols of the pilot sub-carriers of the multi-carrier signals transmitted by the subset of the plurality of base stations. The frequency offset is estimated based on a conjugate product between received symbols across at least one pair of multi-carrier symbols of each of the pilot sub-carriers of the selected subset of the plurality of pilot sub-carriers.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

A more complete appreciation of the described embodiments is provided by reference to the following detailed description when considered in conjunction with the accompanying drawings in which reference symbols indicate the same or similar components.

DETAILED DESCRIPTION

Figure 1:
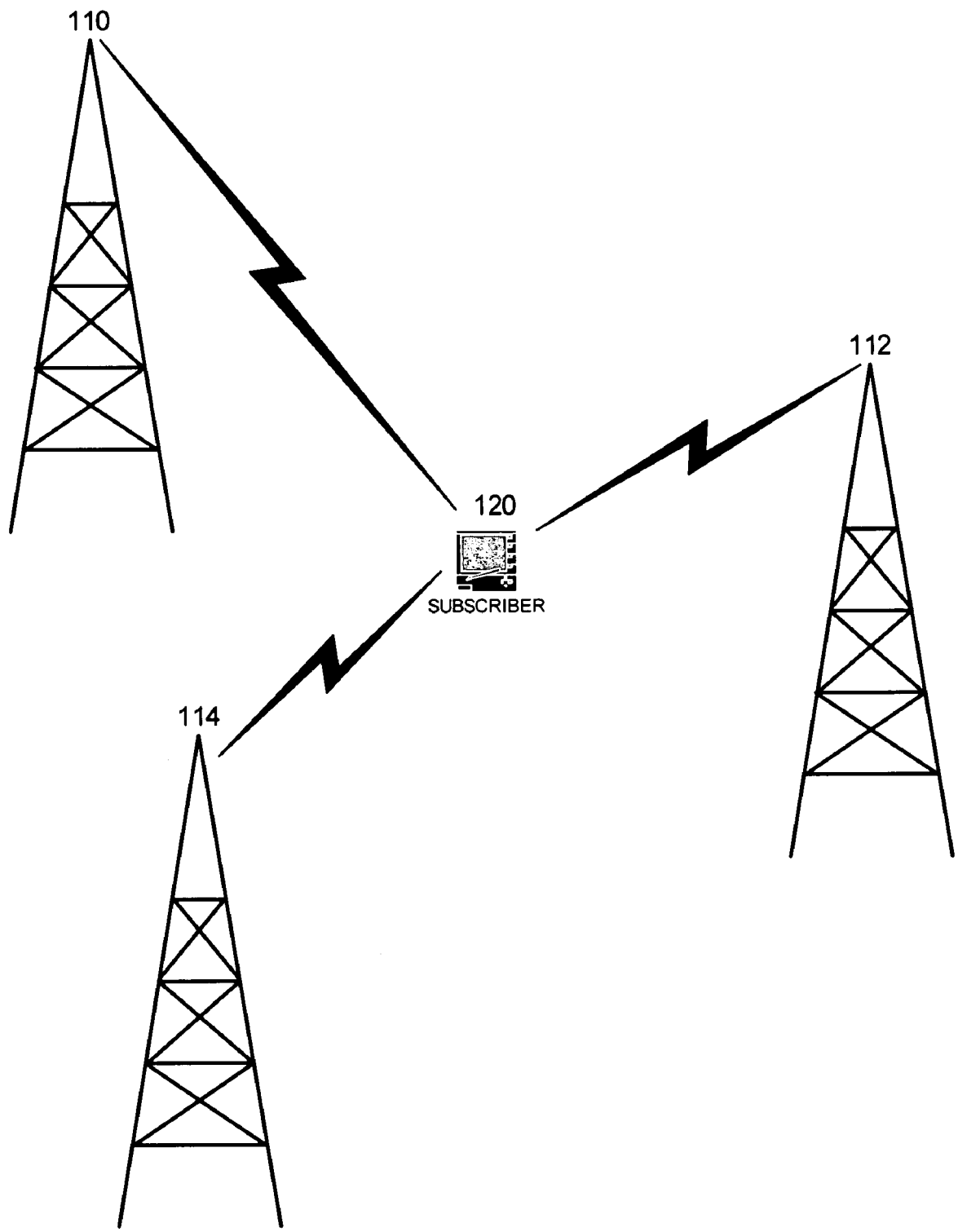
FIG. 1 illustrates an example of a wireless communication system that includes multiple synchronized base stations.

Before describing embodiments, it is to be observed that the embodiments provide examples of methods of estimating frequency offset between a subscriber station and at least one base station of a wireless system. The frequency offset estimation can be used to improve wireless communication of the system.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

It is to be understood that the term symbol can be used having different meanings. The terms multi-carrier symbol and orthogonal frequency division multiplexing (OFDM) symbol are used interchangeably. It is to be understood that an OFDM symbol is a type of multi-carrier symbol. The word symbol can also be used having the meaning of a modulation symbol which is transmitted on a sub-carrier. The term symbol can also be used to denote the received signal on a sub-carrier, in which case can be referred to as a received symbol.

FIG. 1 illustrates an example of a wireless communication system that includes multiple synchronized base stations 110, 112, 114. A wireless subscriber station 120 receives wireless transmission signals from one or more of the base stations 110, 112, 114. The wireless communication system can include various subscriber stations, such as, mobile phones, personal computers, laptops or personal digital assistants (PDAs), and a plurality of base stations. One or more subscriber stations can be located in a service area corresponding to one or more base stations.

One embodiment of the wireless transmission signals of the base stations 110, 112, 114 include pilot sub-carriers that can be used to estimate the frequency offset between at least one of the base stations 110, 112, 114 and the wireless subscriber station 120. As will be described, pilot sub-carriers transmitted from more than one base station 110, 112, 114 can be received by the subscriber station 120. Pilot symbols are transmitted on the pilot sub-carriers. The pilot symbols transmitted by one base station can be completely different from the pilot symbols transmitted by a different base station. The received symbols on selected pilot sub-carriers can be processed to provide an estimate of the frequency offset between the subscriber station 120 and the base stations 110, 112, 114. As will be described, the processing includes summing conjugate products of symbols of selected pilot sub-carriers of pairs of multi-carrier (for example, OFDM) signals.

Figure 2:
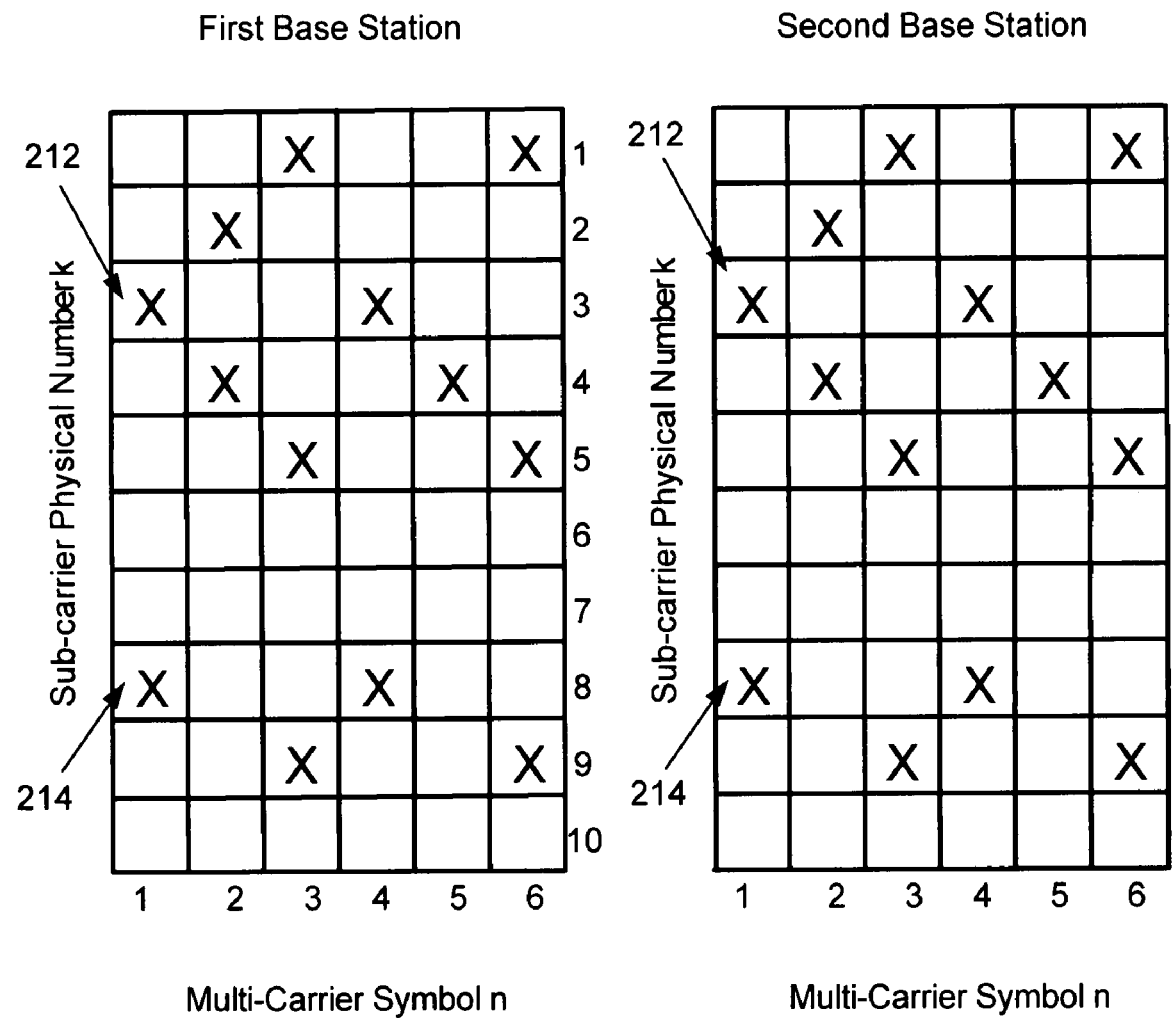
FIG. 2 illustrates an example of a downlink sub-frame of transmission between a base station and a subscriber station.

FIG. 2 illustrates an example of a portion of a downlink sub-frame of transmission between a base station and a subscriber station. The downlink sub-frame includes pilot sub-carriers located at some of the sub-carriers of the multi-carrier symbols. Within the downlink sub-frame, a sub-carrier index can be designated by k and the multi-carrier symbols can be designated by n. FIG. 2 shows 10 sub-carriers (that is, k varies from 1 to 10) and 6 multi-carrier symbols (that is, n varies from 1 to 6). However, it is to be understood that the described embodiments are not limited to any particular ranges of values of k and n.

As mentioned, characteristics of the pilot symbols of the pilot sub-carriers can be observed. Based on the observations, the received symbols of select pilot sub-carriers of pairs of multi-carrier symbols can be used to estimate the frequency offset. The frequency offset can be estimated based on complex conjugates products between received symbols of selected pairs of multi-carrier symbols.

An embodiment includes identifying pilot sub-carriers of pairs of multi-carrier symbols that have transmit pilot symbols that do not change from one multi-carrier symbol to the next multi-carrier symbol of the pairs, for multiple synchronized base stations. As described, the frequency offset can be estimated based on complex conjugate products between the received symbols on these pilot sub-carriers.

Another embodiment includes identifying pilot sub-carriers of pairs of multi-carrier symbols that have pilot symbols that change polarity from one multi-carrier symbol to the next multi-carrier symbol of the pairs, for multiple synchronized base stations. As described, the frequency offset can be estimated based on complex conjugate products between the received symbols on these pilot sub-carriers.

The conjugate products can be summed across multiple frames, and multiple pairs of the same downlink sub-frame. For ease of computation, the modulation format of the pilot symbols can be selected to be binary phase shift keying (BPSK) symbols.

Figure 3:
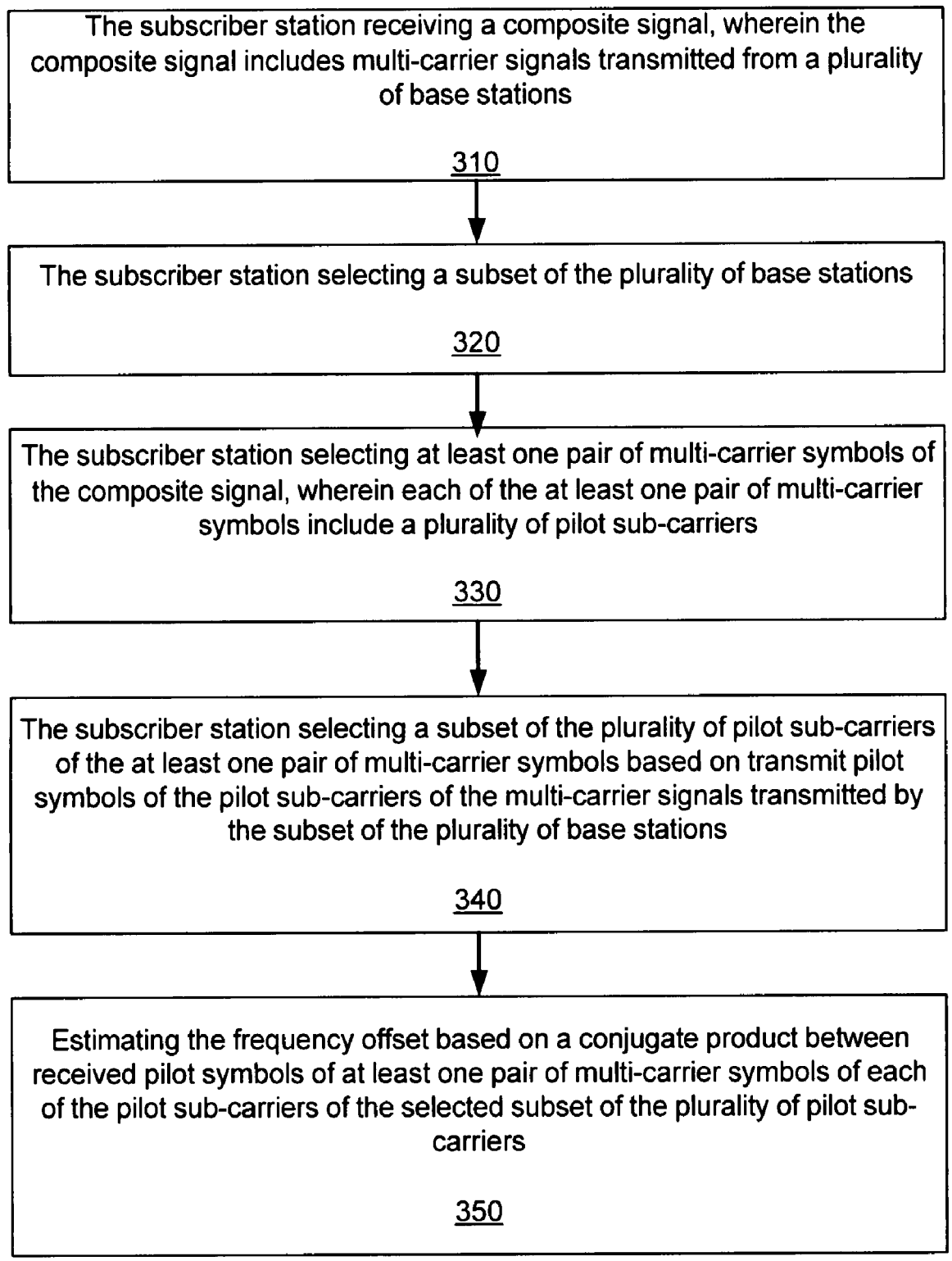
FIG. 3 is a flow chart that includes one example of steps of a method of estimating frequency offset at a subscriber station.

FIG. 3 is a flow chart that includes one example of steps of a method of estimating frequency offset at a subscriber station. A first step 310 includes the subscriber station receiving a composite signal, wherein the composite signal includes multi-carrier signals transmitted from a plurality of base stations. A second step 320 includes the subscriber station selecting a subset of the plurality of base stations. A third step 330 includes the subscriber station selecting at least one pair of multi-carrier symbols of the composite signal, wherein each of the at least one pair of multi-carrier symbols include a plurality of pilot sub-carriers. A fourth step 340 includes the subscriber station selecting a subset of the plurality of pilot sub-carriers of the at least one pair of multi-carrier symbols based on transmit pilot symbols of the pilot sub-carriers of the multi-carrier signals transmitted by the subset of the plurality of base stations. A fifth step 350 includes estimating the frequency offset based on a conjugate product between received symbols of at least one pair of multi-carrier symbols of each of the pilot sub-carriers of the selected subset of the plurality of pilot sub-carriers.

For an embodiment, selecting a subset of the plurality of pilot sub-carriers of the at least one pair of multi-carrier symbols based on pilot symbols of the pilot sub-carriers of the multi-carrier signals transmitted by the subset of the plurality of base stations includes identifying pilot sub-carriers that have transmit pilot symbols that do not change from one multi-carrier symbol to the other multi-carrier symbol of the pair of multi-carrier symbols of the multi-carrier signals for any base station of the subset of the plurality of base stations.

For this embodiment, the frequency offset can be estimated based on a conjugate product between received symbols of at least one pair of multi-carrier symbols of each of the pilot sub-carriers of the above-selected subset of the plurality of pilot sub-carriers. A conjugate product can be performed between received symbols on a given selected sub-carrier but across the two multi-carrier symbols of the pair and this product is summed across the selected subset of the plurality of pilot sub-carriers to obtain a first sum conjugate product. The phase of this sum conjugate product is scaled by a constant to obtain the frequency offset estimate.

For another embodiment, selecting a subset of the plurality of pilot sub-carriers of the at least one pair of multi-carrier symbols based on pilot symbols of the pilot sub-carriers of the multi-carrier signals transmitted by the subset of the plurality of base stations additionally or alternatively includes identifying pilot sub-carriers that have transmit pilot symbols that change in polarity from one multi-carrier symbol to the other multi-carrier symbol of a pair of multi-carrier symbols of the multi-carrier signals for all of the subset of the plurality of base stations.

For this embodiment, the frequency offset can be estimated based on a conjugate product between received symbols of at least one pair of multi-carrier symbols of each of the pilot sub-carriers of the above-selected subset of the plurality of pilot sub-carriers. A conjugate product can be performed between received symbols on a given selected sub-carrier but across the two multi-carrier symbols of the pair and this product is summed across the selected subset of the plurality of pilot sub-carriers to obtain a second sum conjugate product. The phase of this sum conjugate product is scaled by a constant to obtain the frequency offset estimate.

In yet another embodiment, the second sum conjugate product described above is subtracted from the first sum conjugate product described above. The phase of the result is then scaled to obtain the frequency offset estimate.

Several different methods can be used to select the subset of the plurality of base stations. One embodiment includes the subscriber station determining a receive signal strength of each of the multi-carrier signals transmitted by each of the plurality of base stations, and the subscriber station selecting the subset of the plurality of base stations that have a received signal strength greater than a threshold level. Another embodiment includes further limiting the subset by selecting the plurality of N base stations having N greatest received signal strength. Another embodiment includes reducing the subset of the plurality of base stations to the two base stations having two greatest received signal strengths. In various other embodiments, a different subset of base stations can be selected for each of different groups of sub-carriers. In this case, received signal strength is calculated for group a sub-carriers as opposed a single base station subset selection for all the sub-carriers.

Different modulation formats can be used by the base station for pilot sub-carrier transmission. However, in some situations, certain formats can allow for less complexity in computations. For example, as will described, selecting the pilot sub-carrier symbols for symbols using a BPSK constellation simplifies the frequency offset estimation of the receiver.

Different methods can be used by the subscriber station to select the pairs of multi-carrier symbols. An embodiment includes the subscriber station selecting multi-carrier symbols where the pilot sub-carriers indices are the same. Another embodiment includes the subscriber station selecting multi-carrier symbols that are not adjacent. Another embodiment includes the subscriber station selecting multi-carrier symbols with a separation in time that is inversely proportional to the Doppler spread.

Additionally, multiple pairs of multi-carrier symbols of the composite signal can be selected. For one embodiment, the multiple pairs are within a common frame. For another embodiment, the multiple pairs are from different frames.

An algorithmic discussion of the frequency offset requires defining some exemplary terms. As previously described, the sub-carrier index can be defined by k, and the multi-carrier signal (for example, OFDM) can be defined by n. A modulation symbol transmitted on sub-carrier k of symbol n by transmitter (base station) A can be denoted by $s_A(k,n)$.

A receive signal on the sub-carrier k of OFDM symbol n can be represented by;

$$Y(k,n) = H_A(k,n)s_A(k,n) + H_B(k,n)s_B(k,n) + V(k,n)$$

where $H_A(k,n)$ is a complex channel gain on sub-carrier k of OFDM symbol n from transmitter A to receiver C. Similarly, $H_B(k,n)$ is the complex channel gain on sub-carrier k of OFDM symbol n from transmitter B to receiver C. The quantity, $V(k,n)$ is complex additive white Gaussian noise (AWGN) and interference.

The frequency offset can be estimated for some implementations by the phase of a summation of conjugate products between receive symbols n and n+N. That is;

$$R_1 = \left( \sum_{k \in P_n} Y^*(k,n) s_A(k,n) Y(k, n+N) s_A^*(k, n+N) \right)$$

$$e_1(n) = \frac{\alpha}{N} \angle R_1$$

where $P_n$ is the set of pilot sub-carrier indices in OFDM symbol n, and $e_1(n)$ is the estimate of the offset frequency. Where x* represents the complex conjugate of the quantity x, and ∠x denotes the phase of the complex number x. Note that N is chosen so that pilot locations are the same across the two OFDM symbol indices, n and n+N. The quantity α is a scaling factor that depends on the OFDM symbol time. That is, for example, if the OFDM or multi-carrier symbol time is Ts, and the cyclic prefix duration is Tc, then α=1/(Ts+Tc).

In some cases, an IFFT is performed on the signal after removing the transmit pilot symbols of the desired base station. This provides an estimate of the channel impulse response. The impulse response is obtained for both the multi-carrier (OFDM) symbol n and the multi-carrier (OFDM) symbol n+N. Tap locations of the impulse response having significant amounts of energy are selected, and a complex conjugate product is performed between the channel gains across the impulse responses of the two multi-carrier symbols, at the high-energy tap locations. The conjugate products are summed, and the phase of the resulting sum is used to estimate the frequency offset.

Selection of Pilot Sub-Carriers

An embodiment include selecting the pilot sub-carriers in which the corresponding pilot symbols do not change from a first of a pair of multi-carrier symbols to the second of the pair of multi-carrier symbols, for the selected subset of synchronized base stations. That is, determine a first set $P_{n,1}$ of pilot sub-carrier locations k, in which;

$$s_A(k,n)s_A(k,n+N) > 0 \text{ and } s_B(k,n)s_B(k,n+N) > 0.$$

The embodiment can additionally or alternatively include selecting the pilot sub-carriers in which the corresponding pilot symbols change polarity from the first of a pair of multi-carrier symbols to the second of the pair of multi-carrier symbols, for the selected subset of synchronized base stations. That is, determine the second set $P_{n,2}$ of pilot sub-carrier locations k, in which;

$$s_A(k,n)s_A(k,n+N) < 0 \text{ and } s_B(k,n)s_B(k,n+N) < 0.$$

The conjugate product between received symbols on sub-carrier k across the two multi-carrier symbols n and n+N can be represented by:

$$Y^*(k,n)Y(k,n+N).$$

The sum of complex conjugates of the first set $P_{n,1}$ sub-carriers of the two multi-carrier symbols n and n+N can be represented by:

$$\sum_{k \in P_{n,1}} Y^*(k,n) Y(k, n+N).$$

Similarly, the sum of complex conjugates of the second set $P_{n,2}$ sub-carriers of the two multi-carrier symbols n and n+N can be represented by:

$$\sum_{k \in P_{n,2}} Y^*(k,n) Y(k, n+N).$$

Finally, the difference between the summation of the complex conjugates of the first set and the summation of the complex conjugates of the second set can be represented by:

$$R_1 = \sum_{k \in P_{n,1}} Y^*(k,n) Y(k, n+N) - \sum_{k \in P_{n,2}} Y^*(k,n) Y(k, n+N).$$

And the frequency offset can be estimated by;

$$e_2(n) = \frac{\alpha}{N} \angle R_1.$$

The frequency offset estimate can be used as the error signal in a frequency tracking loop. That is, the frequency offset estimate can be input to a filter, and the filter output can be used to adjust the local carrier frequency of the subscriber station.

Although specific embodiments have been described and illustrated, the embodiments are not to be limited to the specific forms or arrangements of parts so described and illustrated.

What is claimed:

1. A method of estimating frequency offset at a subscriber station, comprising:
   the subscriber station receiving a composite signal, the composite signal comprising multi-carrier signals transmitted from a plurality of base stations;
   the subscriber station selecting a subset of the plurality of base stations;

the subscriber station selecting at least one pair of multi-carrier symbols of the composite signal, the at least one pair of multi-carrier symbols each comprising a plurality of pilot sub-carriers;

the subscriber station selecting a subset of the plurality of pilot sub-carriers of the at least one pair of multi-carrier symbols based on transmit pilot symbols of the pilot sub-carriers of the multi-carrier signals transmitted by the subset of the plurality of base stations; and estimating the frequency offset based on a conjugate product between received symbols across at least one pair of multi-carrier symbols of each of the pilot sub-carriers of the selected subset of the plurality of pilot sub-carriers.

2. The method of claim 1, wherein selecting a subset of the plurality of pilot sub-carriers of the at least one pair of multi-carrier symbols based on pilot symbols of the pilot sub-carriers of the multi-carrier signals transmitted by the subset of the plurality of base stations comprises:

identifying pilot sub-carriers that have transmit pilot symbols that do not change from one multi-carrier symbol to the other multi-carrier symbol of the pair of multi-carrier symbols of the multi-carrier signals for any base station of the subset of the plurality of base stations.

3. The method of claim 1, wherein selecting a subset of the plurality of pilot sub-carriers of the at least one pair of multi-carrier symbols based on pilot symbols of the pilot sub-carriers of the multi-carrier signals transmitted by the subset of the plurality of base stations comprises:

identifying pilot sub-carriers that have transmit pilot symbols that change in polarity from one multi-carrier symbol to the other multi-carrier symbol of a pair of multi-carrier symbols of the multi-carrier signals for all of the subset of the plurality of base stations.

4. The method of claim 1, wherein selecting a subset of the plurality of pilot sub-carriers of the at least one pair of multi-carrier symbols based on pilot symbols of the pilot sub-carriers of the multi-carrier signals transmitted by the subset of the plurality of base stations comprises:

identifying pilot sub-carriers that have transmit pilot symbols that do not change from one multi-carrier symbol to the other multi-carrier symbol of a pair of multi-carrier symbols of the multi-carrier signals for any of the subset of the plurality of base stations, and identifying pilot sub-carriers that have transmit pilot symbols that change in polarity from one multi-carrier symbol to the other multi-carrier symbol of a pair of multi-carrier symbols of the multi-carrier signals for all of the subset of the plurality of base stations.

5. The method of claim 4, further comprising:

summing conjugate products between received symbols on pilot sub-carriers that have transmit pilot symbols that do not change from one multi-carrier symbol to the other multi-carrier symbol of the pair of multi-carrier symbols summing conjugate products between received symbols on pilot sub-carriers that have transmit pilot symbols that do change in polarity from one multi-carrier symbol to the other multi-carrier symbol of a pair of multi-carrier symbols of the multi-carrier signals; and estimating the frequency offset based on subtracting the summed conjugate products of received symbols on pilot sub-carriers that have transmit pilot symbols that do change in polarity from the summed conjugate products of received symbols on pilot sub-carriers that have transmit pilot symbols that do not change.

6. The method of claim 1, wherein the subscriber station selecting a subset of the plurality of base stations comprises:

the subscriber station determining a received signal strength of each of the multi-carrier signals transmitted by each of the plurality of base stations;

the subscriber station selecting a subset of the plurality of base stations that have a received signal strength greater than a threshold level.

7. The method of claim 6, further comprising the subscriber station reducing the subset of the plurality of base stations to N base stations having N greatest received signal strength.

8. The method of claim 6, further comprising the subscriber station reducing the subset of the plurality of base stations to two base stations having two greatest received signal strengths.

9. The method of claim 1, wherein the subscriber station selecting a subset of the plurality of base stations comprises:

selecting different subsets of base stations for each of different groups of sub-carriers, wherein the selections are based on a received signal strength for each of the groups of sub-carriers.

10. The method of claim 1, wherein the pilot symbols of the multi-carrier signals transmitted by the plurality of base stations are BPSK modulated.

11. The method of claim 1, wherein the subscriber station selecting at least one pair of multi-carrier symbols of the composite signal, comprises the subscriber station selecting multi-carrier symbols where the pilot sub-carriers indices are the same.

12. The method of claim 1, wherein the subscriber station selecting at least one pair of multi-carrier symbols of the composite signal, comprises the subscriber station selecting multi-carrier symbols that are not adjacent.

13. The method of claim 1, wherein the subscriber station selecting at least one pair of multi-carrier symbols of the composite signal, comprises the subscriber station selecting multi-carrier symbols with a separation in time that is inversely proportional to a Doppler spread.

14. The method of claim 1, further comprising selecting multiple pairs of multi-carrier symbols of the composite signal.

15. The method of claim 14, wherein the multiple pairs are within a common frame.

16. The method of claim 14, wherein the multiple pairs are from different frames.

17. The method of claim 1, further comprising using the frequency offset estimate as an error signal in a frequency tracking loop.

18. A subscriber station, comprising:

means for receiving a composite signal, the composite signal comprising multi-carrier signals transmitted from a plurality of base stations;

means for selecting a subset of the plurality of base stations;

means for selecting at least one pair of multi-carrier symbols of the composite signal, the at least one pair of multi-carrier symbols each comprising a plurality of pilot sub-carriers;

means for selecting a subset of the plurality of pilot sub-carriers of the at least one pair of multi-carrier symbols based on transmit pilot symbols of the pilot sub-carriers of the multi-carrier signals transmitted by the subset of the plurality of base stations; and means for estimating the frequency offset based on a conjugate product between received symbols across at least one pair of multi-carrier symbols of each of the pilot sub-carriers of the selected subset of the plurality of pilot sub-carriers.

* * * * *